UNITED STATES PATENT OFFICE.

C. L. FRINK, OF ROCKVILLE, CONNECTICUT.

IMPROVED RUBBER PACKING.

Specification forming part of Letters Patent No. 54,523, dated May 8, 1866.

*To all whom it may concern:*

Be it known that I, C. L. FRINK, of Rockville, Tolland county, State of Connecticut, have invented a new and Improved Rubber Composition; and I do hereby declare that the following is a full, clear, and exact description thereof, which will enable others skilled in the art to make and use the same.

This invention consists in a compound made of india-rubber, sulphur, black lead, or other suitable material, (generally mixed with rubber to give it consistency and to increase its weight,) and metal filings, brass filings being used by preference, in such a manner that a compound is obtained which is not liable to stick when exposed to a great heat or to steam, and which is particularly fit for packing safety-valves, globe-valves, or other parts which are exposed to the action of steam, and which when packed with ordinary rubber require constant repairs.

The metal filings which I use in mixing my rubber composition may be taken from shops just as they can be obtained, or they may be prepared expressly for my purpose and made in any suitable fineness, according to the nature of the work for which the rubber is to be used.

I mix the filings with the mass simultaneously with the sulphur and black lead or clay or other ingredients which are usually mixed with the crude rubber, and when the composition is made I vulcanize or cure the same in the ordinary manner. The quantity or proportion of filings to be mixed with the rubber is variable, according to the nature of the work for which the rubber is to be used.

For packings of small valves about one-tenth part by weight of filings is sufficient.

Packing made from this composition is not liable to stick when exposed to the heat of steam, and my composition is therefore particularly fit for packing safety-valves, globe-valves, and other similar articles which are used in steam-boilers or steam-engines.

What I claim as new, and desire to secure by Letters Patent, is—

A rubber compound made of the ingredients herein specified, for the purposes set forth.

C. L FRINK.

Witnesses:
 E. I. SMITH,
 R. L. FREICE.